C. LE G. FORTESCUE.
SINGLE PHASE MOTOR.
APPLICATION FILED DEC. 24, 1918.
1,376,421.
Patented May 3, 1921.
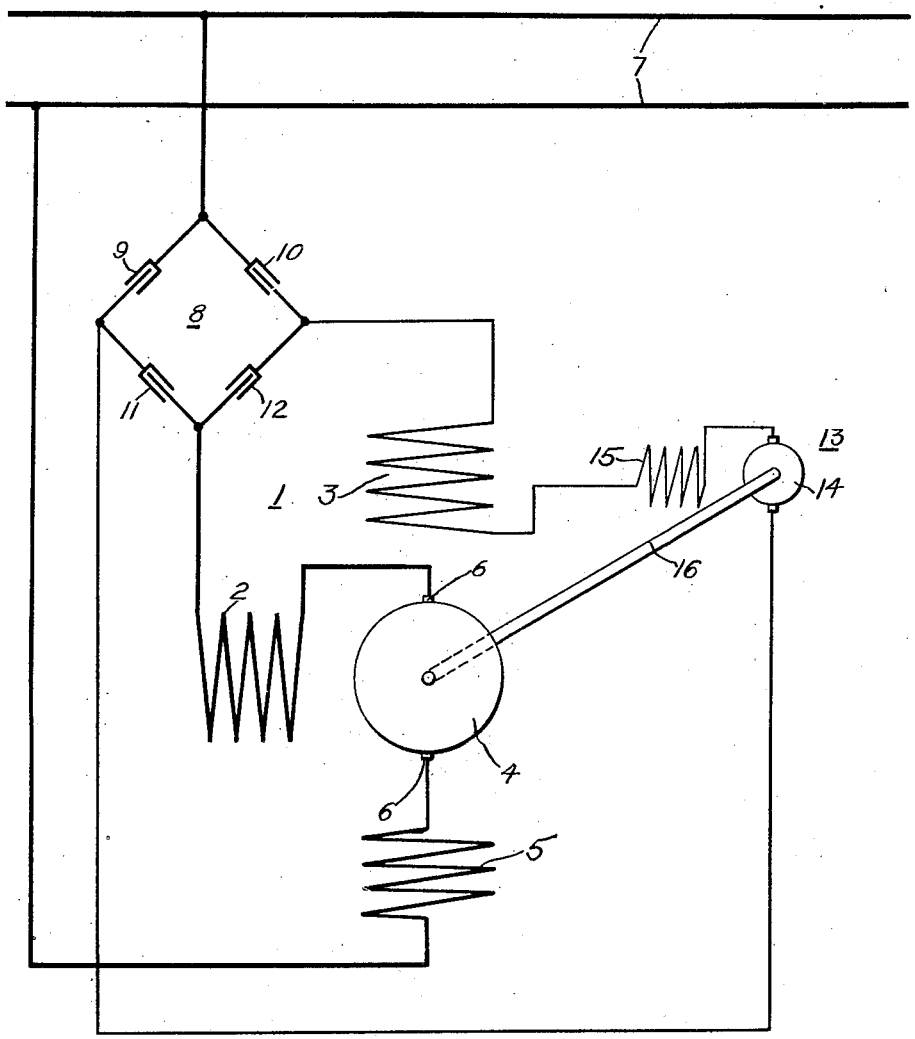
WITNESSES:
INVENTOR
Charles LeG. Fortescue.
BY
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

SINGLE-PHASE MOTOR.

1,376,421. Specification of Letters Patent. Patented May 3, 1921.

Application filed December 24, 1918. Serial No. 268,176.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Single-Phase Motors, of which the following is a specification.

My invention relates to commutator-type, alternating-current motors, and particularly to motors of the character designated which are operated from a single-phase source of energy and have a main exciting field winding as well as an auxiliary commutating field winding, and it has for its object to provide means whereby the operation of such motors is effected with a minimum amount of commutating difficulty.

In motors of the character described, the main exciting field winding has a transformer effect upon the short-circuited armature coil which is undergoing commutation. In order to annul this transformer effect, a commutating field winding is employed which induces a field in such direction and phase relationship that, due to the rotation of the armature of the motor, a rotational electromotive force is set up which, under normal operation, will neutralize the transformer electromotive force in the short-circuited coil above referred to. However, it is a matter of more or less difficulty to properly regulate the strength of the commutating field when the speed of the motor varies to any considerable extent. As the speed of the motor increases, it is obvious that, to effect proper neutralization, the field strength of the commutating field winding should decrease or, in other words, the current flowing therethrough should become smaller as the speed of the motor increases, since the product of flux and speed determines the voltage set up in the above-described short-circuited armature coil.

One object of my invention, therefore, is to provide means whereby the current passing through the commutating field winding will automatically and inherently vary in inverse proportion to the speed of the motor.

Another object of my invention is to arrange the field and main circuits of a motor of the character designated in such manner that the constants of the commutating-field-winding circuit will contribute, in a large measure, to the control of the current passing therethrough and to further effect such inverse-current regulation by inherent means, thus doing away with the complicated switching apparatus which has heretofore been necessary in order to compensate for the transformer action in the short circuited coil and thereby avoid the usual commutating difficulties which are experienced with motors of this type.

Moreover, in the following description of my invention, it should be understood that the system is entirely reversible and may be used with equal benefit in connection with generators or re-generating systems.

The single figure of the drawing illustrates diagrammatically a single-phase commutator motor supplied from a single-phase source of energy and having associated therewith the necessary elements to effect the required inverse-current regulation.

In this drawing, I show, at 1, a single-phase, commutating-type motor provided with a main exciting field winding 2 and a commutating field winding 3. The armature member is indicated at 4, while a compensating winding 5 is shown connected in series with the main field winding 2 and brushes 6—6 which supply energy to the armature 4. The machine 1 derives single-phase energy from any suitable source, here shown as single-phase mains 7.

Inserted in series-circuit relationship with the main exciting field winding 2 and the armature circuit 4 is a reactive static network 8 composed of a plurality of reactance elements, here shown, for convenience, as four in number, 9, 10, 11 and 12, and as of the condenser type. It will be observed that the elements are arranged in the form of a square and that the armature circuit and exciting field winding are connected across one diagonal thereof.

A series commutating dynamo-electric machine 13, provided with an armature member 14 and a series field winding 15, is mounted upon a shaft 16 which is common for both the machine 13 and the main motor 1. It is obvious, of course, that any other means for rotating the machine 13 in constant-speed ratio with the machine 1 may be used in this connection.

The circuit, containing the commutating field 3 and the machine 13, is connected across the other diagonal of the reactive network 8 and, as will hereinafter be explained, a current in quadrature to that flowing through the main field winding traverses the commutating field winding 3.

In the following description of the operation of a system constructed in accordance with the present invention, the reactance of the circuit containing the commutating field winding and the machine 13 will be indicated by $jx$, the resistance thereof by $r$, and the ratio between the current flowing in the commutating winding and that flowing in the main field winding by $n$.

Turning for a moment to the series-excited machine 13, assume that a current equal to $i$ flows through the commutating field 3 and, therefore, through the machine 13. The flux generated in the series field winding 15 will then be proportional to the current $i$. The electromotive force generated will be proportional to the product of the speed of the machine 13 and the current $i$. By changing the speed of this machine, the resistance contained in the aforesaid circuit will be changed in the same sense and, therefore, the series-excited commutator machine comprises a means for regulating inversely the amount of current flowing through the commutating field 3. By reason of the machine 13 having its speed increased in the same sense as the speed of the main motor increases, it is obvious that the current flowing in the commutating field will be regulated in accordance with the speed of the main motor.

However, it is necessary, in order to obtain correct results with the apparatus above set forth, to establish correct values for the reactance elements contained in the bridge arms of the phase-splitting device 8 and to so correlate these values with the resistance and reactance values of the commutating field circuit that the transformer electromotive force set up in the short-circuited armature coil by the main exciting field is normally annulled by the rotational electromotive force generated by the short-circuited coil moving through the field set up by the commutating-field-winding flux. Having once established the proper values for the bridge arms in question, the provision of the series-excited machine will thereafter result in the current passing through the auxiliary commutating field winding varying in inverse ratio to the speed of the main motor.

Assuming, as previously stated, that the reactance of the circuit in which the field winding 3 and auxiliary machine 13 are contained is equal to $jx$, the resistance or power component of the effective impedance is equal to $r$ and the ratio between the currents in the two fields equal to $n$, it may be mathematically proved that two of the bridge arms should have the value $j(x-nr)$, and that the other two should have the value $j(x+nr)$, the effect of the operator, $-j$, being to rotate the vectors 90° ahead of the quantities in parenthesis. It will be observed that the arms of the first-mentioned value should alternate in position with the arms of the last-mentioned value and it will, moreover, be apparent that, should the term "$-nr$" become positive, the reactance elements indicated by those values will have an inductive character. However, since the value "$+nr$" cannot become negative and, moreover, since the bridge, in this instance, is normally one containing condensive elements, it is apparent that at least two of the elements of the bridge will remain condensive, even though the values of the constants in the circuit change materially.

The proof of these statements is as follows. In any static network, such as my bridge 8, the equations for the primary and secondary electromotive forces are $$E_1 = z_{11}I_1 + z_{12}I_2$$
$$E_2 = z_{12}I_1 + z_{22}I_2,$$

where $I_1$ and $I_2$ are the primary and secondary currents entering the network by the positive leads. (See Slepian's "Limitations on Transformations," equations (8) and (8'), *A. I. E. E. Proceedings*, vol. 38, Sept. 1919.)

In these equations, $z_{11}$ and $z_{22}$ may be defined respectively as the primary and secondary self impedances of the network, and $z_{12}$ may be defined as the mutual impedance thereof. Thus, $z_{11}$ and $z_{22}$ are respectively the primary and the secondary electromotive force produced in the respective phase by a current of one ampere in that phase, when the current in the other phase is zero. Similarly, $z_{12}$ may be defined as the electromotive force produced in either phase when no current is flowing in that phase but a current of one ampere is flowing in the other phase.

The impedance of the load on the secondary phase is given as $(r+jx)$. Hence $$E_2 = (r+jx)(-I_2),$$

whence $$z_{12}I_1 + z_{22}I_2 + (r+jx)I_2 = 0.$$

It is required also that the secondary current shall lag 90° behind the primary current, and that the ratio between the two currents shall be $n$, in order to have good commutation. Hence $$i = I_2 = \pm jnI_1$$

according to the connections of the commutating field terminals. Hence we have $$z_{12} \pm jnz_{22} \pm jnr \mp nx = 0.$$

Assuming a resistanceless bridge, in order that there shall be no loss in the transformation, $z_{22}$ and $z_{12}$ must be purely imaginary. Equating real and imaginary parts, we find $$z_{12} = \mp jnr$$
$$z_{22} = -jx$$

Assuming a symmetrical bridge, with $z_{22} = z_{11}$, we have $$z_{11} + z_{12} = -j(x \pm nr)$$
$$z_{11} - z_{12} = -j(x \mp nr)$$

Turning to the bridge shown in the drawing, and assuming the primary current entering at the top, and the secondary current entering at the right, we have, remembering that only half of the primary and secondary currents flow in each bridge-arm, and putting $Z_9$ and $Z_{11}$ for the reactances 9 and 11, $$2E_1 = Z_9(I_1 + I_2) + Z_{11}(I_1 - I_2)$$
$$= (Z_9 + Z_{11})I_1 + (Z_9 - Z_{11})I_2$$

But $$2E_1 = 2z_{11}I_1 + 2z_{12}I_2$$

Hence $$Z_9 + Z_{11} = 2z_{11}$$
$$Z_9 - Z_{11} = 2z_{12}$$

Whence $$Z_9 = z_{11} + z_{12} = -j(x + nr)$$
$$Z_{11} = z_{11} - z_{12} = -j(x - nr)$$

I have provided a compensating winding in series with the main-load circuit and wound in such direction that the currents which are generated in this winding and in the armature winding substantially neutralize each other. I have found this to be expedient in order that the commutating field shall not, in addition to its normal function, operate in such a manner that the armature circuit, as a whole, shall be inductively affected.

While I have shown the phase-splitting means combined with the commutating field and the dynamo-electric means as composed of condensive elements, it is obvious that many other phase-splitting devices may be used in this connection and the proper values obtained by calculation, and what I regard as my invention, therefore, and wish to particularly cover in the appended claims, is the combination of any such phase-splitting device with dynamo-electric means and a commutating field, the constants of such circuit being of such value that the proper association of the dynamo-electric machine with the main motor will result in an inverse regulation of the current passing through the commutating field and the consequent constant neutralization of the electromotive forces generated in the short-circuited armature coil of the main motor.

By "static network" is meant any combination of self and mutual inductors, condensers and resistors, not involving polyphase dynamo-electric machines. It is, of course, understood that a static inductor, condenser or resistor may always be replaced by a single-phase dynamo-electric machine having equivalent impedance.

I claim as my invention:

1. A single-phase commutator motor comprising an armature circuit, a main exciting field winding, a commutating field winding, a reactive static network for supplying said commutating field winding with a current in quadrature relationship to the current passing through said armature circuit, and means, dependent upon the speed of said motor, for regulating the current flowing in said commutating field winding, whereby the rotational electromotive force in the short circuited coil of said armature circuit shall be constantly annulled by the transformer electromotive force therein.

2. A single-phase commutator motor comprising an armature circuit, a main exciting field winding, a commutating field winding, a reactive static network comprising at least two condensive elements for supplying said commutating field winding with a current in quadrature relationship to the current passing through said armature circuit, and means, dependent upon the speed of said motor, for regulating the current flowing in said commutating field winding, whereby the rotational electromotive force in the short-circuited coil of said armature circuit shall be constantly annulled by the transformer electromotive force therein.

3. A single-phase commutator motor comprising an armature circuit, a main exciting field winding, a commutating field winding, a bridge comprising four reactive elements arranged in a square, at least two of said elements being condensive, and these condensive elements alternating in position with the remaining reactive elements, whereby said commutating field winding shall be supplied with a current in quadrature relationship to the current passing through said armature circuit, and means dependent upon the speed of said motor for regulating the current flowing in said commutating field winding, whereby the rotational electromotive force in the short-circuited coil of said armature circuit shall be constantly annulled by the transformer electromotive force therein.

4. In combination with a source of alternating current, a single-phase commutator motor comprising an armature circuit, a main exciting field winding, a commutating field winding, a bridge composed of reactive elements arranged in a square, one diagonal of said bridge being connected in series-circuit relationship with said main field winding, and said commutating field winding being connected across the other diagonal of said bridge, and means dependent upon the speed of said motor for regulating the current flowing in said commutating field wind- 5. In combination with a source of alternating current, a single-phase commutator motor comprising an armature circuit, a main field winding, a commutating field winding, a two phase static network composed of reactive elements, one phase of said network being connected in series-circuit relationship with said main field winding, and said commutating field winding being connected across the other phase of said network, dynamo-electric means included in said commutating field winding circuit, the constants of said network, said commutating field winding and said dynamo-electric means being so adjusted that the ratio of the current flowing through said commutating field winding to that flowing through said main field winding shall be so varied that the rotational electromotive force in the short-circuited coil of said armature circuit shall be constantly annulled by the transformer electromotive force therein.

6. A single-phase commutator motor comprising an armature circuit, a main exciting field winding, a commutating field winding, means comprising a reactive static network for supplying said commutating field winding with a current in quadrature to that flowing in said armature circuit, dynamo-electric means included in said commutating-field-winding circuit, and means associating said dynamo-electric means and said single-phase motor for so rotating said dynamo-electric means that the current in said commutating field winding shall vary inversely as the speed of said main motor varies, whereby the rotational electromotive force in the short circuited coil of said armature circuit shall be constantly annulled by the transformer electromotive force therein.

7. A single-phase commutator motor comprising an armature circuit, a main exciting field winding, a compensating winding, a commutating field winding, means for supplying said commutating field winding with a current in quadrature to that flowing in said armature circuit, dynamo-electric means included in said commutating field winding circuit, and means associating said dynamo-electric means and said single-phase motor for so rotating said dynamo-electric means that the circuit in said commutating field winding shall vary inversely as the speed of said main motor varies, whereby the rotational electromotive force in the short circuited coil of said armature circuit shall be constantly annulled by the transformer electromotive force therein.

8. In combination with a source of alternating current, a single-phase motor comprising an armature circuit, an exciting field winding, a commutating field winding, means connected to said source of alternating current for supplying a quadrature current to said commutating field winding, and dynamo-electric means connected in series with said commutating field winding, means for automatically increasing the speed of said dynamo-electric means as the speed of said single-phase motor increases, whereby the rotational electromotive force in the short circuited coil of said armature circuit shall be constantly annulled by the transformer electromotive force therein.

9. In combination with a source of alternating current, a single-phase commutator motor comprising an armature, a bridge comprising four reactive elements arranged in a square, one diagonal thereof being connected across said source of alternating current and said commutating field winding being connected across the other diagonal of said square, and dynamo-electric means connected in series relationship with said commutating field winding, the reactance of the circuit containing the commutating field winding and the dynamo-electric means being equal to $x$, the resistance thereof being equal to $r$, and the ratio of the current flowing therein to that flowing in the commutating field winding being equal to $n$, and two of said reactive elements having a value equal to $(x+nr)$, and the other two of said reactance elements being equal to $(x-nr)$.

10. A combination, as set forth in claim 9, the quantity $n$ being a measure of the speed of the single-phase commutator motor.

11. A combination, as set forth in claim 10, the dynamo-electric means being so designed that the quantities $x$ and $nr$ are substantially constant, whereby the combination is inherently self-adjusting without varying the reactive elements of the bridge.

12. A combination, as set forth in claim 11, including as the dynamo-electric means, a single phase series commutator machine having the characteristics specified.

13. The combination with a main dynamo-electric machine of the single-phase commutator-type having an exciting field winding and an armature circuit connected in series and a commutating field winding, of means for exciting said commutating field winding in such a manner that the current therein shall be in quadrature relationship to the armature current and shall be proportional numerically to $n$ times the armature current, where $n$ is a measure of the speed, said means comprising a two-phase static network having one phase connected in series circuit relationship with said main field winding and said armature circuit and the other phase connected in series circuit relationship with said commutating field winding, and an auxiliary dynamo-electric machine mechanically coupled to said main dynamo-electric machine and electrically connected in series circuit relationship with said commutating field winding, said auxiliary dynamo-electric machine being so designed that the reactance $x$ of the circuit including said machine and said commutating field winding shall be substantially constant and the resistance $r$ of said circuit shall vary substantially inversely as the speed of the main dyanmo-electric machine.

14. A combination, as set forth in claim 13, characterized by the fact that the static network has a substantially resistanceless mutual impedance which is numerically equal to $nr$, and a substantially resistanceless self impedance in the phase which is connected to the commutating field winding which is numerically equal to $x$, whereby substantially correct commutating field winding currents may be maintained without adjustment of the values of the elements making up the static network.

15. Means for improving the commutation of a main commutator-type single-phase dynamo-electric machine, comprising a commutating field winding adapted to carry current of the proper strength and in the proper phase with respect to the current flowing in the commutator circuit, a two-phase static network interconnecting said commutator circuit and said commutating field circuit, and an auxiliary dynamo-electric machine operating at a speed corresponding to the speed of said main machine and electrically connected in series circuit relationship with one of the phases of said network.

16. Means as defined in claim 15, characterized by the fact that said auxiliary machine is connected in series circuit relationship with the phase which is connected to said commutating field winding.

17. Means as defined in claim 16, characterized by the fact that said auxiliary machine is designed to make the effective combined resistance of the commutating winding and the auxiliary machine substantially inversely proportional to the speed of the machines, while maintaining the effective combined reactance of said commutating winding and said auxiliary machine substantially constant.

18. Means as defined in claim 17, characterized by the fact that the static network has substantially constant mutual and self impedances of such value that substantially correct commutating field winding currents may be maintained without adjustment of the network.

19. A combination, as set forth in claim 18, including as the auxiliary dynamo-electric machine, a series single-phase commutator machine having the characteristics specified.

In testimony whereof, I have hereunto subscribed my name this 27th day of Nov., 1918.

CHARLES LE G. FORTESCUE.

It is hereby certified that in Letters Patent No. 1,376,421, granted May 3, 1921, upon the application of Charles Le G. Fortescue, of Pittsburgh, Pennsylvania, for an improvement in "Single-Phase Motors," errors appear in the printed specification requiring correction as follows: Page 2, line 67, for "$j(x-nr,)$" read $-j(x-nr,)$, and line 69 for "$j(x+nr)$" read $-j(x+nr)$; and that the said Letters Patent should be read with these corrections therein that the same may conform to the record of the case in the Patent Office.

Signed and sealed this 14th day of June, A. D., 1921.

[SEAL.]

WM. A. KINNAN,

*Acting Commissioner of Patents.*

Cl. 172—276.